United States Patent [19]

Severn et al.

[11] Patent Number: 5,463,863
[45] Date of Patent: Nov. 7, 1995

[54] FUEL CONTROL SYSTEM

[75] Inventors: Michael J. Severn; Anthony J. Northcott; Anne G. Rowlinson, all of Bristol, England

[73] Assignee: Rolls-Royce plc, Derby, England

[21] Appl. No.: 662,970

[22] Filed: Sep. 19, 1984

[30] Foreign Application Priority Data

Oct. 6, 1983 [GB] United Kingdom ............ 8326804
Jul. 27, 1984 [GB] United Kingdom ............ 8419292

[51] Int. Cl.⁶ .................................................. F02C 9/00
[52] U.S. Cl. ................. 60/39.03; 60/39.06; 60/39.48; 60/741; 60/742
[58] Field of Search ............ 60/39.03, 39.06, 60/39.48, 734, 741, 742, 39.81

[56] References Cited

U.S. PATENT DOCUMENTS 3,121,456  2/1964  McCathron et al. ............... 158/36.4
4,337,616  7/1982  Downing ................................. 60/742

FOREIGN PATENT DOCUMENTS 1495274  12/1977  United Kingdom .

*Primary Examiner*—Donald P. Walsh
*Attorney, Agent, or Firm*—Oliff & Berridge

[57] ABSTRACT

A fuel control system for a gas turbine aero engine comprises a first metering valve 22 which is controlled by a feed back loop 43 in flow series with a manually operated metering valve 34. A pressure drop regulator 31, 39 regulates the pressure drop across the series connected valves 22, 34. In this way response of the control system is directly influenced by movement of the manual valve 34 and the automatic valve 22 stabilizes the fuel flow rate in response to monitored operating parameters of the engine.

5 Claims, 3 Drawing Sheets

FUEL CONTROL SYSTEM

BACKGROUND OF THE INVENTION

This invention relates to fuel control systems for gas turbine aero engines and is particularly concerned with fuel control systems for use in aircraft capable of landing and taking-off vertically.

The British Aerospace P.L.C. Harrier aircraft is powered by a Rolls-Royce P/C Pegasus engine which employs vectorable hot and cold propulsive thrust nozzles. When landing vertically the nozzles are pointed downwards and the fuel flow is adjusted to control the upward thrust. By adjusting the upward thrust, vertical speed of the aircraft can be changed and the aircraft can be landed in a controlled manner. At the instant that the undercarriage wheels contact a firm base, some of the weight of the aircraft is transferred to the wheels and consequently the upward thrust momentarily exceeds the weight of the aircraft. Unless this thrust is diminished rapidly the aircraft is prone to "jump" upwards causing problems, for example, on wet decks. During descent, pilots are trained to detect "touch-down" and slam the throttles shut immediately. If the pilot or the fuel control system responds too slowly, the aircraft may bounce.

One current form of fuel control system employs a digital electronic control unit (DECU) which monitors various engine parameters (such as pressures, temperatures, speeds of rotation of spools etc.) and is responsive to movements of the pilot's throttle lever, to operate a motor driven valve which controls the flow of fuel to the engine. It is customary to provide an independently operable manual control system which enables the pilot to override the DECU controlled system. In general, the manual flow control valve (MFC) is inoperative when the DECU controlled system is operating and a change over valve is provided. Nevertheless the MFC is linked to the movement of the pilot's throttle lever and for most of the time the MFC is being moved in synchronism with the pilot's lever but is redundant because it is not controlling fuel flow. Due to the high work load and the intense concentration required during landing, it is not practical for the pilot to switch to manual control during landing.

SUMMARY OF THE INVENTION

An object of this invention is to provide a fuel control system which has a rapid response to sudden acceleration or deceleration demands.

The invention as claimed herein achieves a more rapid response than presently known electrical systems because the flow rate through the main metering part of the system (the first and second flow control valves) varies instantaneously due to the second valve not being part of a feedback control loop and the flow rate is controlled by regulating the pressure drop.

The invention as claimed herein also retains the automatic control over the flow of fuel to the combustion equipment by employing a feedback loop to control the first valve.

DESCRIPTION OF THE PREFERRED EMBODIMENTS

The present invention will now be described, by way of examples, with reference to the accompanying drawings in which.

Figure 1:
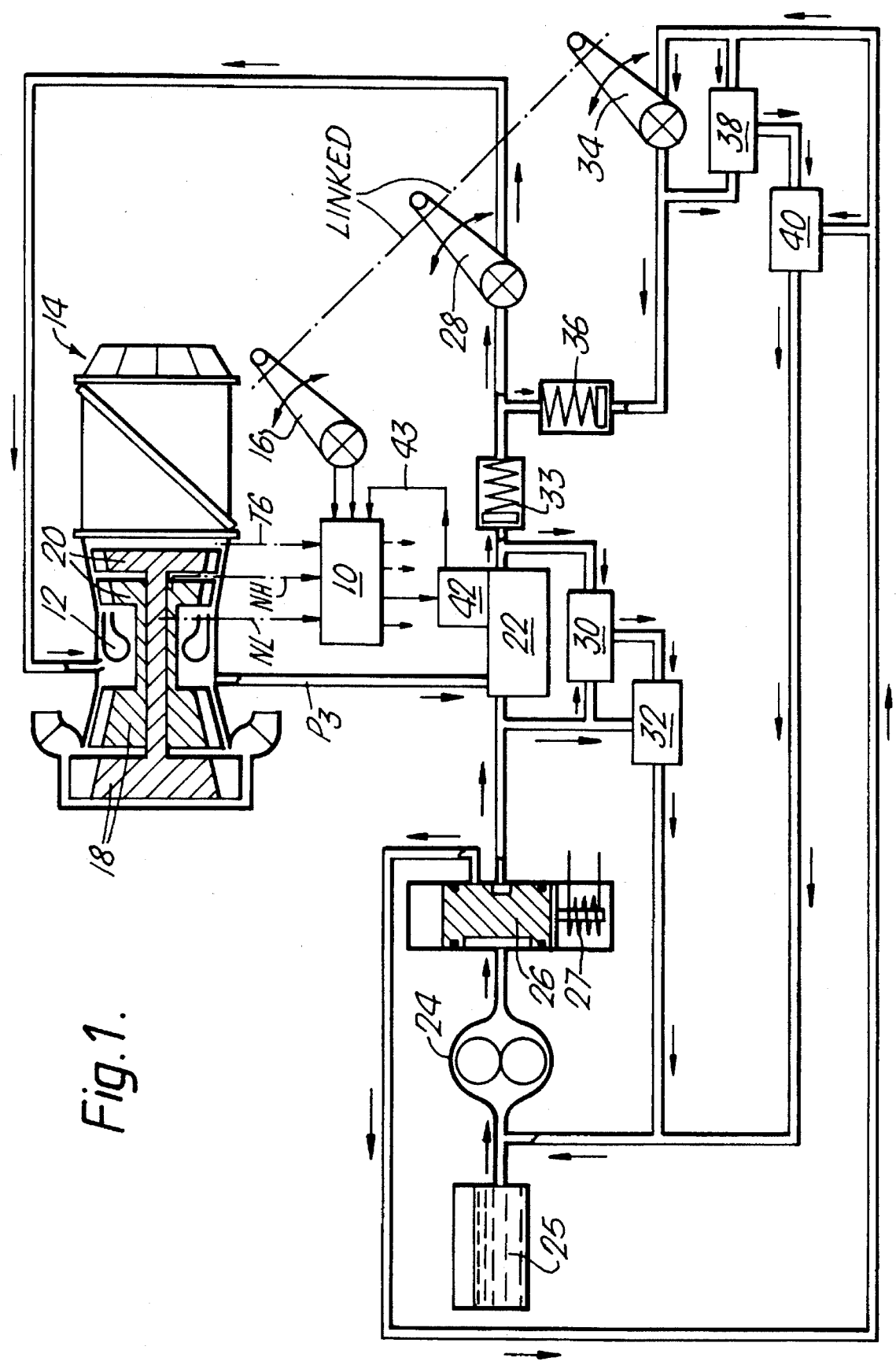
FIG. 1 illustrates schematically a prior known fuel control system for a gas turbine aero engine which does not incorporate the present invention.

Referring to FIG. 1 there is shown a known fuel control system which employs a digital electronic control unit 10 (DECU). The DECU 10 controls the rate of fuel flow to the combustion equipment 12 of the engine 14 in response to movement of a throttle lever 16 by the pilot of the aircraft.

The DECU 10 monitors the position of the throttle lever 16 relative to a datum and also monitors various parameters of the engine and its environs.

Examples of such parameters are pressures and temperatures within the engine and ambient pressures and temperatures, speeds of rotation of one or more of the compressors 18 or turbines 20 of the engine, and altitude and forward speed of the aircraft. The DECU computes and compares the monitored parameters with predetermined schedules of parameters and relates this information to the position of the throttle lever 16 to operate a motorized main metering valve 22 as described below.

A gear pump 24 is provided to supply pressurized fuel from the aircraft tanks 25 to a selector valve 26 (sometimes called a change-over valve) activated by a solenoid valve 27 which enables the pilot to override the control system and operate it manually. The pressurized fuel is supplied to the inlet of the main metering valve 22, and flows via a non-return valve 33 and a shut-off valve (sometimes called a shut-off-cock) 28, which is ganged to move with the pilot's throttle lever 16, to the main jets of the combustion equipment 12. The fuel flow rate through the main metering valve 22 is controlled by measuring the pressure drop across the inlet and outlet of the valve 22 by means of a pressure drop regulator 30 and controlling a spill valve 32 which returns excess fuel back to a location upstream of the pump 24. In this way the pressure drop is regulated to predetermined values. To provide a facility for adjusting the fuel flow rapidly if the engine surges, the H.P. compressor delivery pressure $P_3$ is also used to adjust the metering valve 22 directly and thereby cut-off or severely reduce the flow of fuel to the combustion equipment in the event of the engine surging.

When the selector valve 26 is moved to the manual position, the main metering valve 22 is by-passed and the pressurized fuel is directed from the pump 24 to a manual fuel control (MFC) throttle valve 34 which is ganged to move with the throttle lever 16 and the shut-off valve 28. The flow from the MFC throttle valve 34 flows via a non return valve 36 to the main jets of the combustion equipment 12 of the engine. The fuel flow rate through the MFC throttle valve is controlled by a pressure drop regulator 38 and a spill valve 40 which returns excess fuel to the pump 24 inlet.

During normal use, the main metering valve 22 controls the flow of fuel to the combustion equipment 12, and the MFC throttle valve 34, the pressure drop regulator 38 and spill valve 40 are redundant.

It will be seen that the main metering valve 22 is controlled by a feedback loop 43 which incorporates the DECU 10, and a stepping motor 42 which opens and closes the valve 22 to vary the flow rate. The response time of the valve 22 is dependent upon the time taken for the DECU 10 to sample and compute the various parameters and the ramp time of the stepping motor. These restraints may seriously limit performance of the system during vertical landings.

Figure 2:
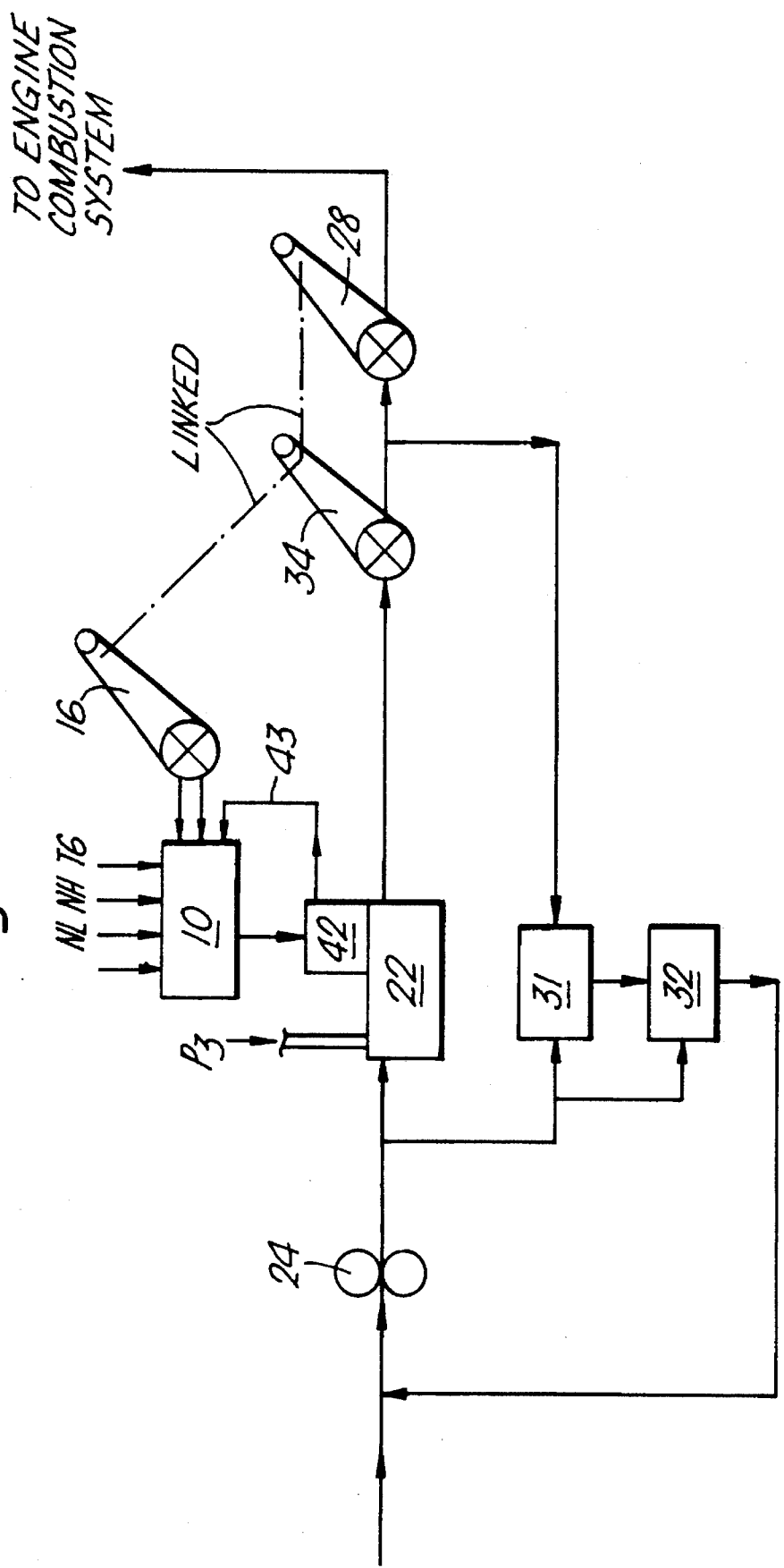
FIGS. 2 and 3 illustrate schematically fuel control systems for a gas turbine aero engine incorporating the present invention.

Referring to FIG. 2, there is shown a fuel system constructed in accordance with the present invention and employing similar component parts to that shown in FIG. 1.

Components identical to those of FIG. 1 have been given the same reference numerals as those of FIG. 1. The fuel system of FIG. 2 comprises a gear pump 24 for supplying pressurized fuel to a main metering valve 22. The valve 22 functions exactly as described in FIG. 1 and responds to signals generated by the DECU 10 and to the pressure $P_3$. Connected in flow series with the main metering valve 22 is a manually controlled throttle valve 34 which is ganged to move with the pilot's throttle lever 16 and a shut-off valve 28. A pressure drop regulator 31 is connected across the inlet of valve 22 and the outlet of valve 34, and a spill valve 32 is provided to return excess fuel to the pump 24, controlling the flow rate through the combination of valves 22 and 34.

Figure 3:
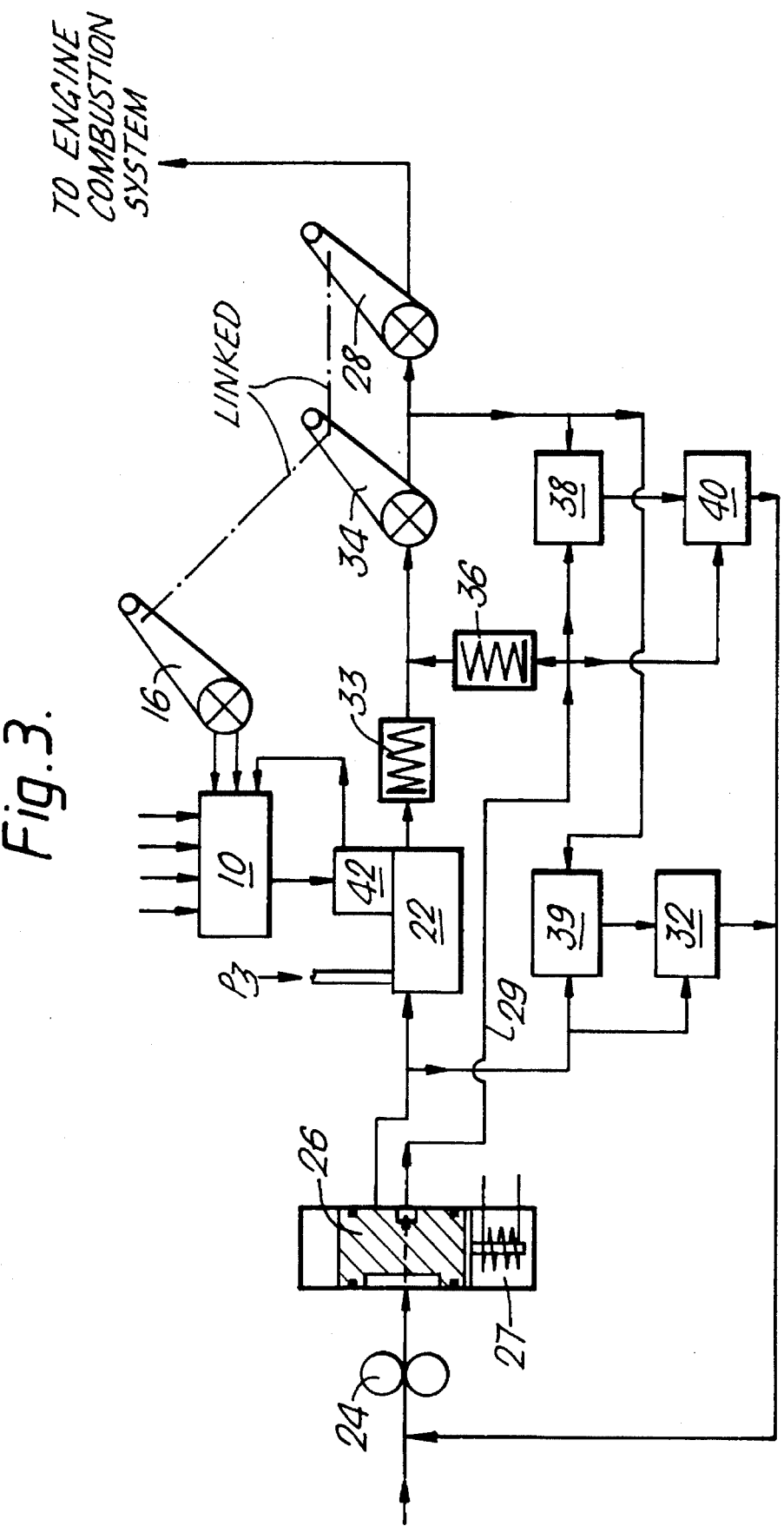

Referring to FIG. 3, there is shown a further embodiment of the present invention. Here again components which are similar to those described and shown in FIG. 1 are given the same reference numerals and function as described above. Referring to FIG. 3 the shut-off valve 28 is combined with the MFC throttle valve 34. In this case the main metering valve 22 and the MFC throttle valve 34 are connected in series and pressure drop regulators 38,39 and spill valves 32,40 are provided to regulate the pressure drop across the two series-connected valves 22 and 34. Non-return valves 33 and 36 are provided in the pipe line connecting the two valves 22,34 and between the selector valve 26 and the MFC throttle valve 34. The selector (or change-over) valve 26 is provided to enable the pilot to switch from automatic control (where the DECU 10 and the series connected valves 22 and 34 operate to control the fuel flow rate) to manual control (where the valve 22 is by-passed and regulation of the fuel flow rate is solely under the control of the MFC throttle valve 34 in combination with pressure drop regulator 38 and spill valve 40).

The functions of pressure drop sensing and fuel spill (items 38,40; 31,32 and 39,32) may be performed by single devices rather than the separate items shown. The essence of the FIG. 3 version is that valve 34 can do two jobs, i.e. fast response and manual fuel control (MFC), the FIG. 2 version illustrates the principle involved in obtaining a fast response.

In operation, the flow rate through the main metering part of the system (valves 22 and 34) is directly responsive to movements of the pilot's throttle lever 16 because the valve 34 is ganged to move with lever 16, and the flow rate through valve 34 is responsive to the position of the valve 34 and the position of the valve 22. The response of the system is greatly improved, particularly when rapid accelerations or decelerations are demanded, because fuel flow rate is changed instantaneously without waiting for the DECU to carry out its calculation and adjustment procedures and without the delays caused by the ramp times of the energizing signals to the stepping motor which drives the valve 22. Nevertheless, automatic control of the fuel flow rate by the DECU 10 controlling valve 22 is retained, and the overall effect of the valve 34 is not to render the valve 22 redundant because the DECU 10 will stabilize the fuel flow rate at the rate demanded by the pilot's lever, and valve 34 becomes a passive part of the control system until it is moved to a new position.

The shut off valve 28 shown in FIGS. 1 to 3 is designed so that although it is moved with the lever 16, it is fully open for all movements of the lever 16 between the lowest idle speed of the engine and the maximum speed of the engine. The shut off valve 28 is only moved to the closed position (where it stops the fuel flow) to shut down the engine for "normal" shut down or emergency shut down.

From FIG. 1 it will be seen that during movement of the pilot's lever to control the fuel flow, only valve 22 is operational to control the fuel flow. In the embodiment of the present invention as shown in FIG. 2, both of the valves 22 and 34 control the fuel flow, and in the case of the embodiment of FIG. 3 the control system functions with both of the valves 22 and 34 controlling the fuel flow or just the valve 34 (where manual control is selected.)

We claim:

1. A fuel control system for regulating the flow of fuel to combustion equipment of a gas turbine engine, the fuel control system comprising flow metering means, an inlet of which, in operation, is connected to a source of pressurized fuel, and an outlet of which, in operation, is connected to the combustion equipment, and pressure regulator means operable to regulate the pressure drop across the inlet and outlet of the flow metering means, the flow metering means comprising, in flow series, a first valve which is controlled by a feed back loop and a second, manually operable valve which is not controlled by a feed back loop.

2. A fuel control system according to claim 1 wherein a third valve is provided between the flow metering means and the combustion equipment, and the third valve is selectively operable to shut-off the fuel supply to the combustion equipment independently of the first and second valves when desired.

3. A fuel control system according to claim 1 wherein the pressure regulator means comprises a first pressure regulator connected across the inlet and outlet of the first valve and a second pressure regulator connected across the inlet and outlet of the second valve.

4. A fuel control system according to claim 1 wherein the pressure regulator means includes one or more spill valves which are operable to divert excess fuel above a predetermined flow rate away from the combustion equipment.

5. A fuel control system according to claim 1 wherein a fuel flow passage is provided which by-passes the first valve, and a selector valve is provided which is movable between a first position where it connects a source of pressurized fuel to the inlet of the flow metering means, and a second position where it connects the source of pressurized fuel to the inlet of the second valve via said fuel flow passage and thereby by-passes the first valve.

* * * * *